United States Patent
Ermler et al.

(10) Patent No.: US 11,442,431 B2
(45) Date of Patent: Sep. 13, 2022

(54) INDUSTRIAL CONTROL SYSTEM

(71) Applicant: Siemens Aktiengesellschaft, Munich (DE)

(72) Inventors: Rene Ermler, Erlangen (DE); Jörg Neidig, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/649,542

(22) PCT Filed: Sep. 21, 2018

(86) PCT No.: PCT/EP2018/075569
§ 371 (c)(1),
(2) Date: Mar. 20, 2020

(87) PCT Pub. No.: WO2019/057873
PCT Pub. Date: Mar. 28, 2019

(65) Prior Publication Data
US 2020/0310392 A1    Oct. 1, 2020

(30) Foreign Application Priority Data

Sep. 22, 2017 (EP) .................................. 17192679

(51) Int. Cl.
*G05B 19/418* (2006.01)
*H04L 9/32* (2006.01)

(52) U.S. Cl.
CPC ..... *G05B 19/4185* (2013.01); *G05B 19/4183* (2013.01); *G05B 19/4188* (2013.01); *H04L 9/3263* (2013.01)

(58) Field of Classification Search
CPC ............ G05B 19/4185; G05B 19/4183; G05B 19/4188; G05B 19/0426; H04L 9/3263
See application file for complete search history.

(56) References Cited

U.S. PATENT DOCUMENTS

| 5,437,044 A | 7/1995 | Hohner et al. |
| 2016/0085226 A1 | 3/2016 | Tanaka |

(Continued)

FOREIGN PATENT DOCUMENTS

| DE | 4236247 A1 | 4/1994 |
| DE | 69309315 T2 | 10/1997 |

(Continued)

OTHER PUBLICATIONS

PCT International Examination Report and Written Opinion of International Examination Authority dated Jan. 24, 2019 corresponding to PCT International Application No. PCT/EP2018/075569 filed Sep. 21, 2018.

*Primary Examiner* — Christopher E. Everett
(74) *Attorney, Agent, or Firm* — Henry M. Feiereisen LLC

(57) ABSTRACT

An industrial control system includes an engineering device having a security key, a memory and a first user interface embodied as a display representing a second user interface of an operating device of the industrial control system. The engineering device stores project data and furthermore includes an engineering program running in a cloud, wherein for implementing calculation results, commands and outputs are transmitted via the cloud to the engineering device and/or the operating device. A programming device connects the engineering device to a cloud device. A method for controlling the industrial control system is also described.

12 Claims, 1 Drawing Sheet

(56) References Cited

U.S. PATENT DOCUMENTS

2017/0025040 A1* 1/2017 Maturana ............... G05B 17/02
2018/0052451 A1* 2/2018 Billi-Duran ...... G05B 19/41855

FOREIGN PATENT DOCUMENTS

| DE | 112013006802 T5 | 12/2015 | |
|----|----|----|----|
| DE | 102015221650 A1 | 5/2017 | |
| DE | 102015221652 A1 | 5/2017 | |
| EP | 1564610 A2 * | 8/2005 | ............. G05B 15/02 |
| EP | 1564610 A2 | 8/2005 | |
| EP | 2779009 A2 | 9/2014 | |
| EP | 3037901 A2 | 6/2016 | |
| EP | 3121667 A1 | 1/2017 | |

* cited by examiner

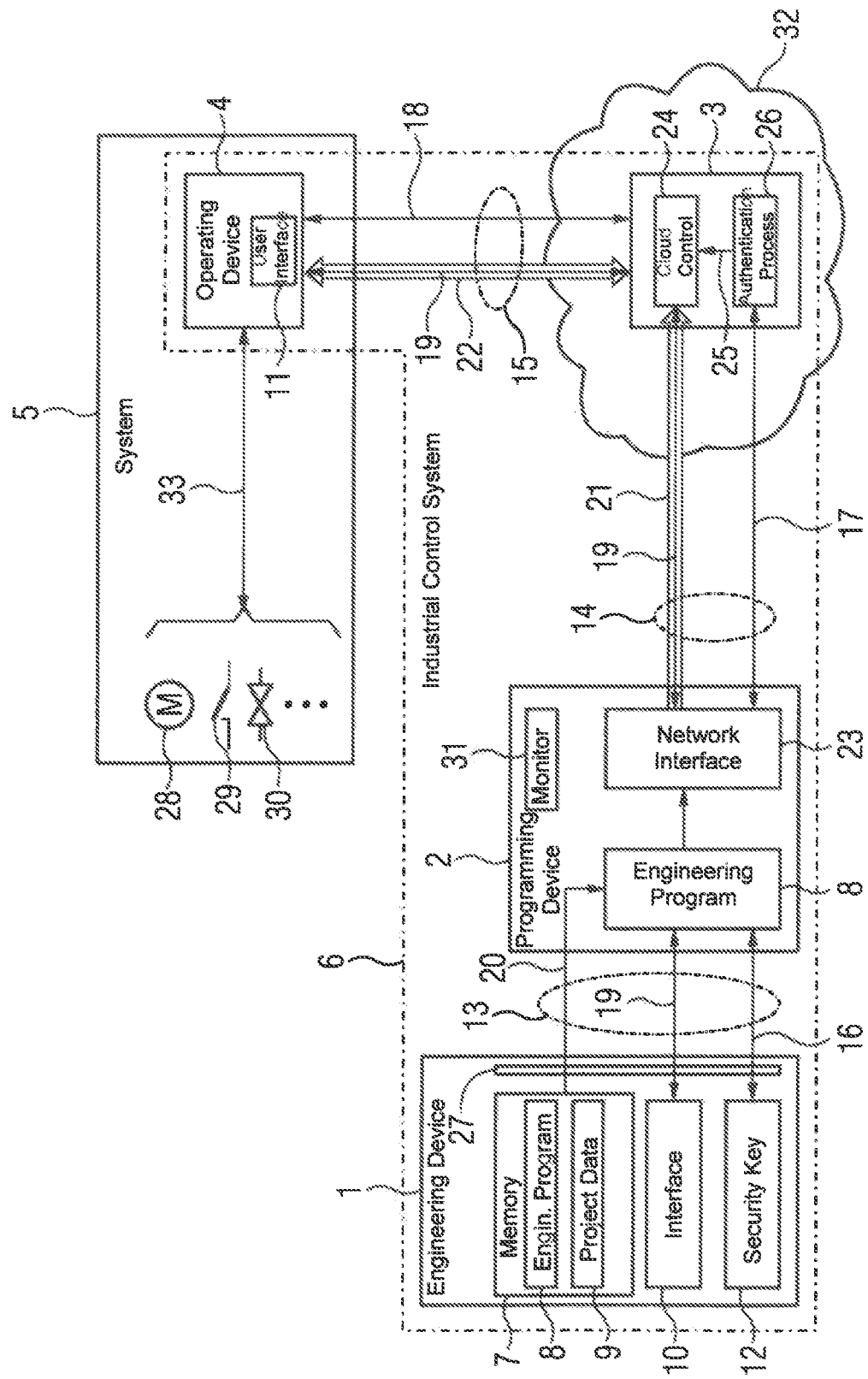

INDUSTRIAL CONTROL SYSTEM

CROSS-REFERENCES TO RELATED APPLICATIONS

This application is the U.S. National Stage of International Application No. PCT/EP2018/075569, filed Sep. 21, 2018, which designated the United States and has been published as International Publication No. WO 2019/057873 A1 and which claims the priority of European Patent Application, Serial No. 17192679.3, filed Sep. 22, 2017, pursuant to 35 U.S.C. 119(a)-(d).

BACKGROUND OF THE INVENTION

The invention relates to an industrial control system.

Industrial control systems are used, for instance, to control and/or regulate processes (e.g. in the chemicals industry, in the pharmaceutical industry, etc.), systems (e.g. a production line, a monitoring system, etc.), machines (e.g. a machine tool, a production machine, etc.), buildings (building automation), robots etc. Production machines are, for instance, plastic injection molding machines, wire-drawing machines, molding presses, paper machines, etc. If the industrial control system is used in a machine tool or a production machine, or in a robot, this can also be referred to as a numerical control system or be embodied as such. If the industrial control system is used in a production line, this can also be referred to as a programmable logic controller (PLC) or be embodied as such. Programmable logic controllers, often abbreviated to PLCs, are also used, for instance, to control simple and complex systems, for instance to produce goods. The PLC or the industrial control system controls and/or regulates motors in a system, for instance, and/or in particular data which describes the state of a system is received from sensors. An engineering system can be used to program and parameterize industrial control systems. In addition to an engineering system, the industrial control system can also have a simulation program. The simulation program is used for instance to calculate a virtual sensor system.

The industrial control system is located in particular at the site of the task to be completed. The programming and/or parameterization is generally also carried out at the place of installation of the industrial control system. This approach is inflexible.

An object of the invention is to increase the flexibility in an industrial control system.

SUMMARY OF THE INVENTION

According to one aspect of the invention, the object is achieved by an industrial control system which has an engineering device, wherein the engineering device has a memory and a user interface, wherein the user interface of the engineering device represents a user interface of an operating device of the industrial control system, wherein the engineering device can be connected to a cloud device by way of a programming device, wherein the engineering device has a security key and project data can be stored.

According to another aspect of the invention, the object is achieved by a method for operating an industrial control system as set forth above.

An engineering device of an industrial control system has a memory and a user interface, wherein the user interface of the engineering device represents a user interface of an operating device of the industrial control system. The engineering device can also be referred to as at least one part of an engineering system. The engineering device is used in particular to program and/or parameterize the industrial control system. The user interface of the engineering device is in particular a display and/or an LED and/or a switch or in each case a plurality thereof. In addition to the engineering device, the industrial control system also has an operating device. During operation of the industrial control system, the engineering device is at a spatial distance in particular from the operating device of the industrial control system. This may be meters or hundreds or thousands of kilometers. The operating device of the industrial control system is located at the site of installation for controlling and/or regulating a process, a system, a machine, a building (building automation), etc. The engineering device is in particular provided for use by a commissioner, a programmer, a machine operator, etc. The operating device also has a user interface, for instance a display and/or an LED and/or a switch or in each case a plurality thereof. At least one part of the user interfaces of the engineering device and operating device are the same. A user of the engineering device, for instance, can therefore allow the same outputs to be output on the user interface of the engineering device as would be the case with the user interface of the operating device. The engineering device is therefore used as a type of representative for the operating device. The operating device has in particular an input interface and/or an output interface for controlling and/or regulating. Motors, switches and/or valves can be activated or regulated by way of the output interface, for instance. Information relating to the position of actuators in the system and/or operating data of the electric machines, the system and/or the sensors can be received by way of the input interface, for instance.

The engineering device is not, or not primarily, provided to control and/or regulate processes, systems, machines, buildings (building automation), etc. and has for this purpose in particular no input interface and/or output interface. Automation tasks can be relocated into the cloud in whole or in part. The cloud can provide IT infrastructure, such as storage space, computing power or application software for example, via the internet. A computing center or a plurality of computing centers and/or a plurality of individual computers can be used for this purpose, for instance. In particular, the cloud computing provides IT infrastructure by way of a computer network, without this having to be present locally. What is known as a cloud service or a Software as a Service can be used in automation technology. In particular, with non-time-critical processes (such as building automation) or tasks, regulation tasks can be relocated into a computing center in the cloud. The relocation therefore takes place into a device in the cloud, in other words into a cloud device, such as a computing center. What is non-time-critical here depends both on the communication link (secure transmission speed, secure bandwidth, etc.), and also on the requirements (automation of a building, of a paper machine, of a machine tool, of a ship, etc.). If a secure connection with respect to time and/or data quantity can therefore be ensured, time-critical tasks can also be relocated into the cloud. Apart from occasional exceptions such as migration of the computing processes in the computing center and/or network problems, the latency of a control system and/or regulation system can lie in the double-digit millisecond range. The sensors and actuators continue to be present locally and connected to suitable network mechanisms with the automation apparatus, of the operating device.

Various methods come into consideration for the programming of such systems. On the one hand, the engineering software can likewise be executed on a server in the computing center. The software is used in the web browser and/or with the aid of a screen sharing technique, e.g. on the basis of remote desktop or similar protocols. On the other hand, the engineering software can be installed locally on a development computer, wherein the entire control program and/or individual modules are transmitted into the cloud control system with the aid of network mechanisms. The cloud control system is therefore in particular an industrial control system in the cloud. Here it may occur that the cloud control system only exists as a process in the computing center. A physical apparatus with a display, switch, memory slot, which provides feedback about the current state of the cloud process, does not exist physically in this embodiment, or only exists as a PC application. An internet connection is required for this purpose. An offline examination or an offline development of the automation program is not possible if this is only stored in the cloud and the cloud cannot be reached. If the program data of the industrial control system is only in the cloud, a local installation of software (engineering system, remote desktop software, VPN tunnel, etc.) can nevertheless be necessary, although a cloud control system, in other words an industrial control system, the functionality and computing power of which is realized in the cloud, can in principle be reached universally in the internet. An engineering system can be installed locally on a computer (e.g. a personal computer, a smartphone, a tablet, etc.) and/or in the cloud, for instance. In this regard an authorization can imperatively be provided on the cloud control system, which has or consists of login data and/or cryptographic material, for instance. Solutions which do without local installation of applications or mobile apps are in particular web-based and are executed in the browser. With such solutions, the source code of the automation program (or its logic or rules) can be stored in the computing center, in other words in the cloud, or transmitted there for compilation. With these pure cloud solutions, in the case of engineering, which is locally separated from the location of the automation, there is no connection between the virtual computing process in the cloud (e.g. in a computing center) and a local, physical apparatus with a display, switch etc. at the site of the engineering.

By means of the engineering device of the industrial control system, which has at least one memory and at least one user interface, a physical device can be realized in a housing at the site of the engineering, which is locally distanced from the site of the automation where the operating device is located, the latter having in particular a display, a switch etc.

In one embodiment of the engineering device, this has a memory (data memory) for storing data. By means of the apparatus of the engineering device, a storage option, e.g. for data and/or files, is therefore produced, which can be combined with the functions of a security token and physical elements such as display and switches, for instance. The security token, which is stored in the engineering device, can be transmitted for instance to the industrial control system (cloud control system) realized in the cloud, in order to enable functions there, for instance.

In one embodiment of the engineering device, this has a security key. The security token is a security key. The security token function executes in particular a cryptographic algorithm and securely stores the key material. If the engineering device has the "security" itself, this can no longer get lost. With a purely software-based access such as with a web-based engineering system and/or a pure cloud control system, the authorization (password, login, key, etc.) can be forgotten, get lost and/or be unobtrusively fraudulently copied or forwarded to unauthorized persons. If the authorization is coupled to the physical apparatus of the engineering device, this problem can be minimized. Solutions with hardware dongles come closest to the requirement to securely store key material and to license functionality. These are realized e.g. as chip cards or USB devices and communicate in encrypted form, e.g. with a server, in order to authorize access to processes or enable functions.

In one embodiment of the engineering device, this has an engineering program. The engineering program is stored in particular on the data memory. The engineering software (in the sense of an application program) and also its complete configuration can be stored in the data memory. The configuration can comprise inter alia licenses, project data, versioning states, access data to the cloud infrastructure and more.

In one embodiment of the engineering device, this has project data, such as a program code. The program code can also be stored in the cloud and/or transmitted there at least for compilation. For protection purposes, this can be carried out using encryption.

In one embodiment of the engineering device, this has a data interface for connecting a programming device. The programming device is for instance a programming apparatus, an engineering PC, a smartphone with a programming app, a tablet with a programming app, etc. The programming device has in particular a network interface or a communication interface for a data link to the internet and accordingly to the cloud. The cloud can be reached in the internet or via the internet.

In one embodiment of the engineering device, this has a display and/or a control element and thus takes the appearance of an automation apparatus, but the programs produced in the engineering device are not executed on this apparatus. Instead, the computing capacity in the cloud is used. There is therefore a cloud control system. The cloud has in particular a computing center. If necessary, a process which executes the automation program is started in the cloud control system.

An industrial control system has an engineering device. The engineering device is for instance of the type described here or an engineering device of another type, which enables the engineering of a technical system. The engineering relates to a technical engineering approach with a technical system. The engineering device of the industrial control system has a memory and a user interface, wherein the user interface of the engineering device represents a user interface of an operating device of the industrial control system. "Represents" can be understood to mean that something is replaced and/or extended and/or duplicated. The replacement and/or extension and/or duplication relates here in particular to mere parts of a whole. Therefore, a user interface of the operating device, for instance, can be embodied in particular by representing an image and/or at least one part of an MMI of the industrial control system. This image can then have in particular the control functions and/or output functions and/or input functions and/or display functions as a user interface. The engineering device and the operating device can be integrated in an apparatus or relate to two separate units or apparatuses.

In one embodiment of the industrial control system, the engineering device can be connected to a cloud device by way of a programming device, wherein the engineering device has a security key and project data can be stored. A secure data link is possible by means of the security key. If the engineering device has project data, this can as a result be stored for instance on site on a system which is to be controlled.

In one embodiment of the industrial control system, the engineering device has an engineering program. The engineering program can therefore run in the cloud. Control and/or regulation functions, in other words their calculation, are executed in particular in the cloud. In order to implement the calculation results, corresponding commands and outputs are in particular transmitted via the cloud to the engineering device and/or the operating device. The industrial control system can be embodied so that the engineering program and/or for instance a program for a programmable logic controller runs in the cloud. The cloud is in particular a popular term for online-based memory, server and/or computing services by way of an intranet and/or the internet.

In one embodiment of the industrial control system, the engineering device has a data interface for connecting a programming device. The data interface is for instance cable-bound or radio-based.

In one embodiment of the industrial control system, this has a cloud device. A memory and/or a server is therefore disposed in the cloud as a cloud device, for instance.

In one embodiment of the industrial control system, which has an operating device, the operating device is embodied to receive control data of the cloud device, wherein the control data is produced by means of the cloud control system. Here control data can also contain data for a regulation, for instance.

In one embodiment of the industrial control system, the engineering program is loaded onto the programming device and can also be executed there. This enables for instance a pragmatic approach with different versions of the engineering program.

In one embodiment of the industrial control system, project data stored on the engineering device is transmitted to the programming device and can be used there by the engineering program. This enables a simple handling of the industrial control system by operating personnel on site.

An industrial control system can be also be embodied so that this has an engineering device, for instance as described above, and a programming device, for instance as described above. The engineering device and the programming device are two different apparatuses, which each have in particular a separate housing. The programming device has in particular a display and a keyboard or a device for moving a cursor or for moving a mouse pointer. The display of the programming device can also be used as a display device for the engineering device.

In one embodiment of the industrial control system, this has a cloud device. The cloud device is for instance a cloud control system, which can be realized in particular in a computing center in the cloud.

In one embodiment of the industrial control system, this has an operating device. The operating device of the industrial control system is located at the site of installation for controlling and/or regulating a process, a system, a machine, a building (building automation), etc. The operating device has in particular I/O interfaces.

On account of the embodiment of the industrial control system, problems in terms of installation, security and/or visualization can be resolved. This is achieved in particular by using a separate engineering device. In one embodiment, the engineering is stored in a mass storage device as a portable application. The storage of the application and/or project data is carried out by implementing a USB mass storage device.

According to a method for operating an industrial control system, wherein the industrial control system has an engineering device, wherein the engineering device has a memory and a user interface, wherein the user interface of the engineering device represents a user interface of an operating device of the industrial control system, wherein the engineering device can be connected to a cloud device by way of a programming device, wherein the engineering device has a security key and project data can be stored, the engineering device and the programming device are used for programming. The industrial control system can further be embodied in one of the forms described again.

With a or the method for operating an industrial control system, an engineering device and a programming device is used for programming, for instance. This makes the system both secure, and also flexible and with the engineering device can give a user the feeling that he is locally programming and parameterizing an industrial control system.

In one embodiment of the method, a cloud device is used. The cloud device is in particular a cloud control system, on which the computing processes to be carried out by an industrial control system are carried out.

In one embodiment of the method, a first data link is embodied between the engineering device and the programming device and a second data link is embodied between the programming device and the cloud device, wherein in particular a third data link is embodied between the cloud device and an operating device. In this way, the engineering device can also communicate with the cloud device and exchange data. This data relates in particular to an authentication or an activation of functions on the cloud control system. Therefore with the purchase of the engineering device, software functions can also be bought and stored in the engineering device and activated by the engineering device on the cloud control system.

The engineering device can be understood to mean a physical representation of a cloud process in a computing center. If for instance the device, in other words the engineering device, is connected to a PC, in other words a programming device, the engineering system is started without a preceding installation process and the user of the device can work with it immediately. All necessary project files are loaded from the apparatus and also stored there again. A change in workplace or a forwarding of the apparatus to other persons is easily possible. The device, in other words the engineering device, represents the state of the automation system and enables its operation. However, the computing capacity for execution is stored on a central computer system in the cloud, the cloud device.

In one embodiment of the method, a security key is transmitted from the engineering device to the programming device. This can be realized with a security token function. The security token function in the engineering device allows for a secure authentication and represents copy protection and manipulation security, by the identity or the presence of the device being proven to the authentication process in the cloud device (e.g. a computing center). The cloud control process in the cloud device is (if necessary) started and access to the process is only granted to the engineering system once the process of authentication has been concluded successfully. With an authentication, secure storage and/or identification, engineering devices can be personalized so that a licensing, which is stored in a decentralized manner on the device, is the functionality and can determine the behavior of the cloud process. The license on the local engineering device controls which properties (in the sense of resources, functions or warranted service quality) are assigned to the process (i.e. the computing functionality) in the cloud.

In one embodiment of the method, the cloud device, in other words in particular the cloud control system, is activated by means of the engineering device. This enables a simple licensing regime.

In one embodiment of the method, an engineering program is stored on the engineering device and executed on the programming device. The engineering device thus requires less computing power and can use computing power from the programming device.

In one embodiment of the method, a bidirectional network connection is used, which is managed by the engineering system, which can be realized by the engineering program, and serves to forward the actions of the operating elements on the engineering device to the cloud control system, in other words the cloud device, and to output the state thereof on the display of the apparatus of the engineering device. The cloud control system and engineering system support the method. The control elements of the engineering device can either represent individual USB devices or be addressed by a supporting process in the device. To this end, the engineering system connects the authentication process in the cloud device and the security token functionality transparently. TOTP (Time-based One-time Password Algorithms) or asymmetric cryptography (e.g. RSA) can be used as protocols. In both cases, cryptographic material is stored in the storage area of the token. It never leaves the security token and thus cannot be copied trivially. An authentication of the server can be implemented in the same way. A transport encryption can be achieved by means of the SSL method. Access restriction can take place either at an operating system level, e.g. by means of firewall technology, or at an application level by means of an authentication token, e.g. OpenID. Successful authentication indicates the presence of an engineering device. Desired properties of the cloud control system are stored in a license file, for instance, which is stored in the storage area of the engineering device. The integrity of the license file is obtained for instance by means of a cryptographic signature, with the key material of the cloud provider or on account of the commitment to a shared secret in the storage area of the security token (HMAC, Hash based message Authentication Code).

A web-based or portable engineering system and/or a dongle-based authentication and/or hardware for outputting the state and/or for connecting at least one control element is also possible for an industrial control system.

BRIEF DESCRIPTION OF THE DRAWING

The invention will be explained in more detail below by way of example with reference to sole FIG. 1, which shows a diagram of an industrial control system according to the invention.

DETAILED DESCRIPTION OF PREFERRED EMBODIMENTS

The diagram shows an engineering device 1. The engineering device 1, which can also be referred to as a virtual industrial control system for engineering, has a memory 7, a user interface 10 and a security key 12. The memory 7 has an engineering program 8 and further data 9. The engineering program 8 can be run hi particular on a programming device 2, which can also be referred to as engineering PC. The further data 9 is for instance project data, source data, license data, key data, etc. The user interface 10 has for instance a display, a switch, an LED, etc. The engineering device has a security key 12, which can be transmitted securely to the programming device 2. The engineering device 1 has a data interface 27. A first data link 13 to the programming device 2 runs via this data interface 27. Security data 16, such as the security key 12, user interface data 19 and/or storage data 20 can be transmitted by way of the first data link 13. Storage data 20 is for instance data which is loaded, read, written and/or executed from the memory 7.

The programming device 2 has the executable engineering program 8. The engineering program 8 is executed on the programming device 2, which also has a monitor 31. Data from the engineering program 8 is to be transmitted via a network interface 23 to a cloud device 3 by way of a second data link 14. The cloud device 3 is located in the cloud, in other words in the internet 32. User interface data 19, engineering data 21 and security data 17 is transmitted via the second data link 14. The cloud device 3 has a cloud control system 24. The cloud control system 24 can be started by an authentication process 26 by way of an enabling 25. A third data link 15 connects the cloud device 3 to the operating device 4. The third data link 15 has control data 22 of the industrial control system, user interface data 19 and security data 18. The operating device has a separate user interface 11. The operating device 4 is integrated into a system 5. The system 5 has motors 28, switches 29, valves 30, etc. These elements can be controlled and/or regulated by way of the operating device 4. Control data 33 is provided herefor.

The separate apparatus of the engineering device 1 can combine a number of otherwise independent methods to form a unit. As a result, an object is produced which can have the following advantages for a user, for instance:

a simple use;
no problems with licenses, for the industrial control system, since they are already included in the engineering device 1;
no installation and configuration of the engineering system is required, since the engineering program is a portable software which can be started directly by the engineering device, wherein a license can already be included;
the type of automation device can be preset or coupled to the license;
no configuration, or additional passwords are required for cloud services;
already secure upon first use on account of the use of strong authentication;
misconfiguration and faulty operation can largely be ruled out;
know-how protection for the user, since project data is stored locally in the engineering device;
know-how protection for the user, since the source code does not in principle have to be stored in the cloud;
know-how protection for the user, since only the compiled control code (e.g. the SPS code) is transmitted to the cloud control system;
the engineering device 1 can be produced from a cost-effective hardware, since it does not represent a complicated industrial control system, but instead just a simple apparatus with a memory and/or LED display and/or LEDs;
know-how protection for a control system manufacturer, since the user does not require the firmware of the automation device, in other words of the industrial control system, to execute the code;

improved scalability, use of resources and/or fault correction options in the event of faults in the control code (e.g. the SPS code), since all processes run in the computing center in the cloud;

secure licensing, since the engineering device 1 also functions as a dongle which cannot be copied;

simple migration solution for users who are rather skeptical of cloud technology, since the user does not have to part with data and source code since a "genuine" device (hardware) is provided with the engineering device 1 and not only a software process in the cloud (computing center).

On account of its execution as a hardware device, the engineering device 1 can represent a local representative for a virtualized industrial control system in a computing center (cloud). The engineering device can join a control part, memory function and dongle technology in order then thus to be able to program a cloud control system. The engineering device can be embodied so that no installation of the engineering system or the engineering program is required. The engineering program can be executed as portable software, so that this can be started directly by the apparatus (engineering device) in order to enable a visualization of the state and a control of the cloud control system on the device. A secure and configuration-less connection to the cloud control system (access data, passwords, crypto keys, etc.) is possible on the apparatus (engineering device 1). A forwarding, an onward sale of the engineering device 1 is possible, wherein a duplication as with a software solution is not possible. The engineering device 1 can be connected to a cloud process as a hardware device, wherein a secure connection which is authenticated on both sides can be ensured between the engineering system or engineering program and the virtualized industrial control system (cloud control system).

What is claimed is:

1. An industrial control system, comprising:
    an operating device having a user interface and configured to receive control data generated by a cloud control system;
    an engineering device comprising
        a security token, a memory and a user interface embodied as a display and representing the user interface of the operating device, the engineering device storing project data,
        an engineering program stored in the memory and running in a cloud, and a license which controls properties assigned to a process in the cloud and comprises a cryptographic signature based on a key from the cloud provider or based on a link to a shared secret in the storage area of the security token, and
    a programming device having a network for a data link to the cloud and a data interface connecting the programming device to the engineering device, with the key or the link to the shared secret in the storage area, of the security token providing a secure data link between the engineering device and the programming device, wherein functions on the cloud control system are activated by the engineering device in response to authentication by the key or the link to the shared secret in the storage area of the security token, and
    wherein for implementing calculation results, commands and outputs are transmitted via the cloud to the engineering device and the operating device.

2. The industrial control system of claim 1, wherein the industrial control system comprises the cloud device.

3. The industrial control system of claim 1, wherein the engineering program is loaded into the programming device and executed in the programming device.

4. The industrial control system of claim 1, wherein project data stored on the engineering device is transmitted to the programming device and used by the engineering program in the programming device.

5. The industrial control system of claim 1, wherein the security token is embodied as a Hash-based Message Authentication Code.

6. A method for operating an industrial control system, which comprises an engineering device having a security token, a memory and a user interface embodied as a display representing user interface of an operating device of the industrial control system, said method comprising:
    storing the security token, project data and a license in the memory on the engineering device, the license comprising a cryptographic signature based on a key from the cloud provider or based on a link to a shared secret in the storage area of the security token;
    running an engineering program in a cloud;
    connecting the engineering device to a cloud device by way of a programming device via a secure data link enabled by the key or the link to the shared secret in the storage area of the security token;
    activating functions on the cloud control system by the engineering device in response to authentication by the key or the link to the shared secret in the storage area of the security token;
    displaying control data of the cloud device that are generated by a cloud control system on the display;
    controlling with the license which properties are assigned to a process representing a computing functionality in the cloud; and
    implementing calculation results, commands and outputs by transmitting the calculation results, commands and outputs via the cloud to the engineering device and to the operating device.

7. The method of claim 6, wherein the calculation results, commands and outputs are transmitted via the cloud by a cloud device.

8. The method of claim 7, further comprising:
    providing a first data link between the engineering device and a programming device which connects the engineering device to the cloud device;
    providing a second data link between the programming device and the cloud device; and
    providing a third data link between the cloud device and the operating device.

9. The method of claim 7, wherein the cloud device is activated by the engineering device.

10. The method of claim 6, wherein the security token is transmitted from the engineering device to the programming device.

11. The method of claim 6, further comprising storing an engineering program on the engineering device and executing the engineering program on the programming device.

12. The method of claim 6, wherein the security token is embodied as a Hash-based Message Authentication Code.

* * * * *